Nov. 24, 1970 E. J. NEITZEL 3,543,233
VEHICLE DISTRESS SIGNAL
Filed Oct. 2, 1968 2 Sheets-Sheet 1
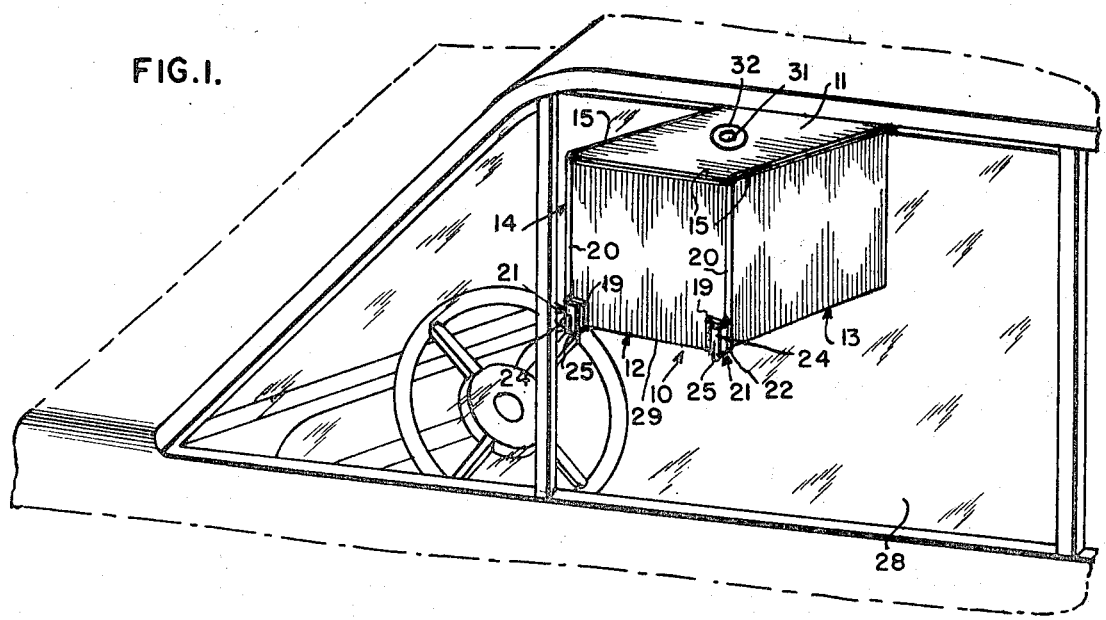
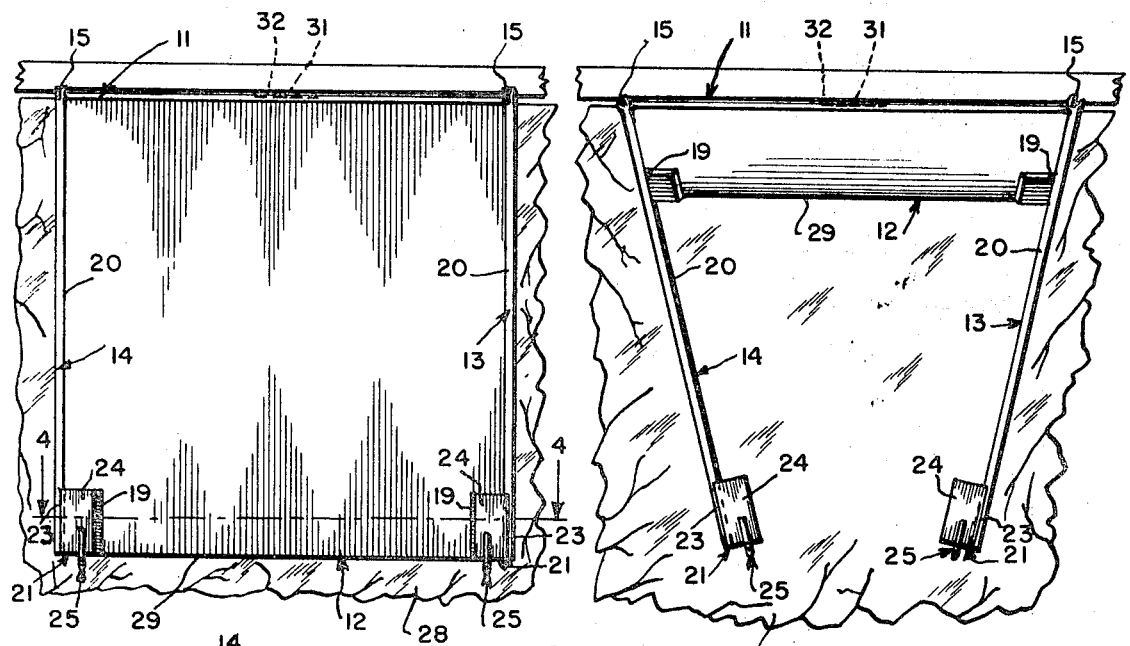
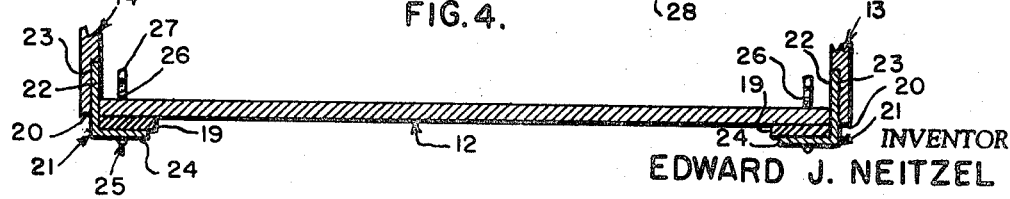
INVENTOR
EDWARD J. NEITZEL
BY John N. Randolph
ATTORNEY

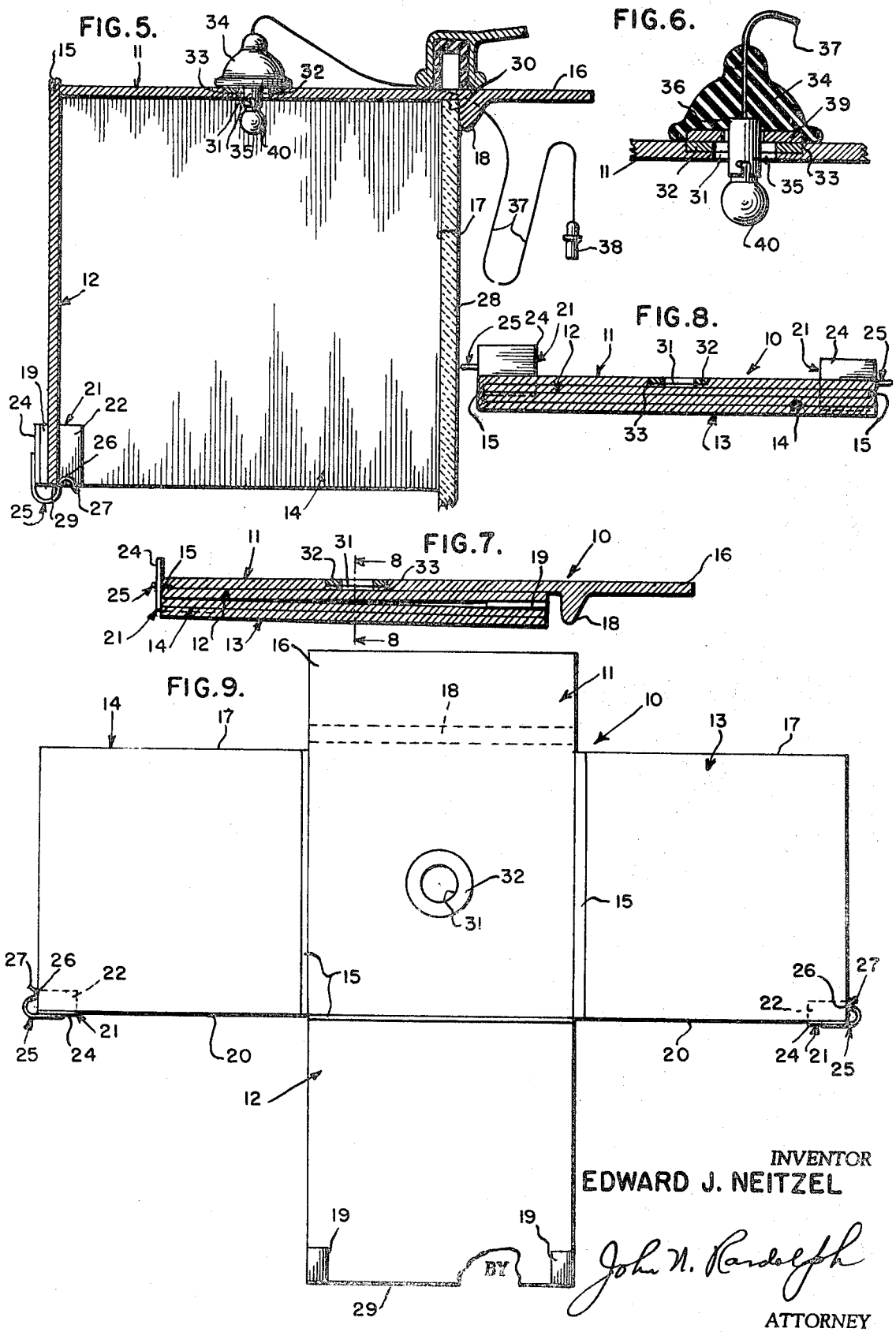

United States Patent Office 3,543,233
Patented Nov. 24, 1970

3,543,233
VEHICLE DISTRESS SIGNAL
Edward J. Neitzel, 420 Henley Ave.,
Pine Beach, N.J. 08741
Filed Oct. 2, 1968, Ser. No. 764,576
Int. Cl. B60g 1/00
U.S. Cl. 340—97
9 Claims

ABSTRACT OF THE DISCLOSURE

A distress signal which is capable of being hung on the outer side of a window of a motor vehicle which has stopped on a highway to visually indicate to passing motorists that the stopped vehicle needs assistance and the type of assistance required, so that the passing motorist may stop at the nearest telephone and call for the required assistance for the stopped vehicle. The signal can be readily folded and stored in a compact manner when not in use, will open automatically and will assume an operative position when passed outwardly through a partially open vehicle window, is capable of being seen from a plurality of directions, and may be readily illuminated for use at night.

SUMMARY

Many motorists are reluctant to stop and offer aid to another motorist for fear for their own safety. It is a primary object of the present invention to provide a very inexpensive yet durable and practical distress signal which may be conveniently carried in a motor vehicle and hung on the outside of a window of the vehicle when the motorist has stopped and is in need of assistance, so that passing motorists, seeing the distress signal displayed, may make a call from the nearest telephone and send aid to the stranded motorist.

Another object of the invention is to provide a distress signal which can be compactly folded when not in use, which can be inserted outwardly through an open vehicle window when required to be displayed, which will automatically assume an open, operative position when a portion thereof has been passed outwardly through the window opening, and which is capable of being suspended on the open window.

Further objects of the invention are to provide a signal which may be readily seen from a number of directions, which may be illuminated for use at night, and which may be made in a variety of colors to indicate different types of assistance required.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is a perspective view showing the distress signal in an operative position on the outer side of a vehicle window for daytime use;

FIG. 2 is an enlarged end elevational view showing the signal in a partially extended, operative position as it is being applied to a vehicle window;

FIG. 3 is an enlarged end elevational view similar to FIG. 2, but showing the signal in a fully extended operative position;

FIG. 4 is an enlarged fragmentary horizontal sectional view taken substantially along a plane as indicated by the line 4—4 of FIG. 3;

FIG. 5 is a substantially central longitudinal sectional view, partly in elevation, showing the distress signal in an operative position for use at night;

FIG. 6 is an enlarged fragmentary vertical sectional view, partly in elevation, of a part of the structure as seen in FIG. 5;

FIG. 7 is a longitudinal substantially central sectional view, on a reduced scale, showing the signal in a folded position for storage;

FIG. 8 is a cross sectional view thereof, taken substantially along a plane as indicated by the line 8—8 of FIG. 7, and FIG. 9 is a fragmentary top plan view showing the signal in blank form with the parts thereof extended and substantially coplanar.

DESCRIPTION OF THE PREFERRED EMBODIMENT

Referring more specifically to the drawing, the distress signal in its entirety and comprising the invention is desigated generally 10 and is composed primarily of four substantially flat plates 11, 12, 13 and 14. The members 12, 13 and 14 are substantially the same size and shape, while the member 11 is of the same width as the members 12, 13 and 14, but of a somewhat greater length. The members 12, 13 and 14 are swingably attached to the member 11 by flexible hinges 15. The member 12 is secured to one end of the member 11 and the members 13 and 14 are connected to the side edges of the member 11 and adjacent the end thereof to which the member 12 is connected, as best seen in FIG. 9, so that the other end 16 of the member 11 forms an extension which extends beyond the inner edges 17 of the members 13 and 14.

The underside of the extension 16, beyond but adjacent the edges 17, has a rib or cleat 18 which extends crosswise of the member 11. The member 12, at the corners thereof disposed remote from its hinged edge and on the outer or underside thereof, is provided with magnets 19. The corners of the members 13 and 14, disposed along the other outer edges 20 thereof and remote from the hinged edges of said members, are provided with metal plates 21 of angular cross section, as best seen in FIG. 4, each including a side 22 which is suitably secured to the inner side of said corner of the member 13 or 14, preferably in a recess 23 thereof, and a side 24 which extends inwardly from the side 22 and which is disposed along the edge 20.

A spring hook or clip 25 is secured to the outer face the bottom or outer edge thereof and then upwardly, to provide a hook portion 26 having a downwardly inclined terminal 27, as best seen in FIG. 5.

The distress signal 10, folded as illustrated in FIGS. 7 and 8, can be conveniently stored in a glove compartment or other available storage space of a motor vehicle. As thus folded, the plate 12 is positioned directly beneath the plate 11 and the plates 13 and 14 are folded beneath the plate 12, one above the other. When the vehicle is compelled to stop along a highway for any reason and there is need for assistance, the operator of the vehicle lowers the window 28 on the driver's side and passes the folded signal 10, as shown in FIG. 7, from right to left, outwardly over the upper edge of the window. When the inner edges 17 of the plates 13 and 14 and the outer edge 29 of the plate 12 clear the upper edge of the window 28, the plates 13 and 14 will swing downwardly and outwardly, as illustrated in FIG. 2, thereby releasing the plate 12 which will swing downwardly and outwardly between said plates 13 and 14. As the plates 12, 13 and 14 approach depending vertical positions, the magnets 19 will attract the metal plates 21, which are formed of a magnetizable substances such as steel, to latch plates 13 and 14 to the plate 12.

In addition, as plate 12 approaches its position of FIGS. 3 and 5, portions of its bottom edge will strike the clip portions 27 for camming the hooks 26 downwardly so that the plate 12 can pass thereover, after which the hooks 26 will spring upwardly due to the resiliency of the clips 25, against the inner side of the plate 12, to additionally latch the plate 12 mechanically to the plates 13 and 14, as seen in FIG. 5. The upper edge of the window 28 engages in the downwardly opening channel 30, formed by the cleat 18, a part of the plate 11 and edges 17, to retain the signal 10 applied to the window 28 with all parts thereof, except the extension 12 and cleat 18, on the outer side of the window. The edges 17 rest against the outer side of the window 28 for holding the signal 10 applied thereto, even if the window 28 is not thereafter raised to its position of FIG. 5.

The parts 11, 12, 13 and 14 thus form a substantially boxed-like structure which is open at its bottom and at the inner side thereof, which faces the window 28, with the member 11 forming the top wall, the member 12, the outer wall, and the members 13 and 14, rear and front walls, respectively.

The parts 11, 12, 13 and 14 are preferably formed of a substantially rigid translucent material which can be readily seen from above, from either the front or rear of the vehicle, or while looking toward the lefthand side of the vehicle, so that it will be readily visible to other passing motorists to indicate that the vehicle, displaying the signal, requires assistance.

Since the signal 10 can be very economically manufactured and sold, it may be produced in a plurality of colors so that a motorist may carry a set of the signals 10, one colored red, for example, to indicate that medical assistance is required; a second which could be colored green, to indicate that the vehicle had mechanical trouble, and a third which could be colored amber, to indicate that the vehicle had exhausted its gasoline supply.

The signal 10 as heretofore described is to be used in the daytime. The same signal 10 is also adapted for nighttime use and for this purpose the top wall 11 is provided with an opening 31. A ring 32 of a magnetizable substance surrounds the opening 31 and is preferably recessed in the upper surface of the wall 11, as seen at 33 in FIG. 5. A cap 34 which is preferably formed of rubber has an end of a light bulb socket 35 secured to a central recess 36 in its underside. An electric cord 37 extends upwardly through the cap 34 from the socket 35 and has an electric plug 38 connected to its other end. A ring-shaped permanent magnet 39 is secured in the underside of the cap 34 around the socket 35 and engages the ring 32, when the socket 35 is inserted downwardly through the opening 31, for attaching the cap 34 to the upperside of the wall 11 for sealing the opening 31 against the passage of moisture downwardly therethrough. A light bulb 40 is mounted in the socket 35 and disposed within the signal 10 for illuminating siad signal when the plug 38 is inserted into a conventional cigarette lighter socket of the motor vehicle. If desired, the light bulb may be energized by a conventional dry cell battery which could be seated in a recess of the cap 34, above the recess 36.

From the foregoing, it will be apparent that the distress signal may be applied to and removed from the window 28 without the necessity of the vehicle operator getting out of the vehicle or opening a door thereof.

I claim as my invention:

1. A vehicle distress signal comprising a top wall, an end wall and side walls, means swingably connecting the end wall and side walls to the top wall for swinging movement by gravity of the end wall and side walls downwardly from a folded position beneath the top wall and wherein said end wall is located between the top wall and side walls to an extended open position, means detachably connecting the end wall to the side walls when said walls are disposed substantially perpendicular to the top wall and in an open position, and said top wall having an extension at the end thereof disposed remote from the means swingably connecting the end wall to the top wall, said extension being adapted to rest on the upper edge of a partially open motor vehicle window for supporting the remainder of the top wall, the end wall and side walls on the outer side of the vehicle window and in an extended, operative position of the signal.

2. A vehicle distress signal as in claim 1, a cleat projecting from the underside of said extension and engaging the inner side of the window for retaining the signal applied thereto.

3. A vehicle distress signal as in claim 2, said side walls having straight inner edges abutting the outer side of the window and combining with said cleat for securing the signal on the window.

4. A vehicle distress signal as in claim 1, said means for latching the end wall to the side walls comprising magnetic means.

5. A vehicle distress signal as in claim 1, said means for latching the end wall to the side walls comprising spring latches carried by the side walls and releasably engaging the end wall.

6. A vehicle distress signal as in claim 1, said walls being formed of a substantially rigid colored material.

7. A vehicle distress signal as in claim 6, said material being translucent, and a light source detachably supported by the top wall and disposed therebeneath and between the side walls for illuminating the signal when the light source is energized.

8. A vehicle distress signal as in claim 1, said walls being formed of a colored translucent material, said top wall having an opening, a cap supported on the top wall for closing and sealing said opening, a light source supported by said cap and extending through said opening, and magnetic means releasably attaching the cap to the top wall.

9. A vehicle distress signal as in claim 8, a light cord extending from the light source, and an electric plug connected to the electric cord and adapted to be electrically connected to the cigarette lighter socket of the vehicle.

References Cited

UNITED STATES PATENTS

| | | | |
|---|---|---|---|
| 2,278,287 | 3/1942 | Ryan | 340—87 |
| 3,351,904 | 11/1967 | Noruk | 340—97 |

RALPH D. BLAKESLEE, Primary Examiner

U.S. Cl. X.R.

340—144